(12) United States Patent
Iwata et al.

(10) Patent No.: US 7,213,558 B2
(45) Date of Patent: May 8, 2007

(54) INTAKE DEVICE FOR OUTBOARD MOTOR

(75) Inventors: Yoshibumi Iwata, Shizuoka-ken (JP); Masanori Takahashi, Shizuoka-ken (JP); Satoshi Miyazaki, Shizuoka-ken (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/281,317

(22) Filed: Nov. 16, 2005

(65) Prior Publication Data

US 2006/0102128 A1    May 18, 2006

(30) Foreign Application Priority Data

Nov. 18, 2004   (JP) ............... 2004-335027

(51) Int. Cl.
*F02M 35/10*   (2006.01)
(52) U.S. Cl. ............................... 123/184.55
(58) Field of Classification Search ........... 123/184.55, 123/184.34
See application file for complete search history.

(56) References Cited

U.S. PATENT DOCUMENTS

| | | | | |
|---|---|---|---|---|
| 4,726,329 A | * | 2/1988 | Atkin | 123/184.34 |
| 5,697,335 A | * | 12/1997 | Kimura et al. | 123/184.21 |
| 5,699,763 A | * | 12/1997 | Phillips et al. | 123/184.21 |
| 6,125,820 A | * | 10/2000 | Hiraoka | 123/336 |
| 6,637,396 B2 | * | 10/2003 | Katayama | 123/184.42 |
| 6,708,662 B2 | * | 3/2004 | Miyashita et al. | 123/184.36 |
| 6,736,100 B2 | | 5/2004 | Katayama | |

* cited by examiner

*Primary Examiner*—Marguerite McMahon
(74) *Attorney, Agent, or Firm*—Knobbe, Martens, Olson & Bear, LLP

(57) ABSTRACT

An engine air intake device for an outboard motor includes a plurality of main intake pipes corresponding to each cylinder. First and second branch pipes extend from an upstream end of each main part. The first branch pipes are longer than the second branch pipes. The second branch pipes each include a valve and are selectively closed. The first branch pipes open into a first surge tank. The second branch pipes open into a second surge tank that is formed separately from the first surge tank. In operation, the valves of the second branch pipes are open when the engine is operating in high engine speed and are closed at low-to-medium speeds.

17 Claims, 6 Drawing Sheets

INTAKE DEVICE FOR OUTBOARD MOTOR

CROSS-REFERENCE TO RELATED APPLICATIONS

This application claims priority to Japanese Patent Application No. JP 2004-335027, which was filed on Nov. 18, 2004, the entirety of which is hereby incorporated by reference.

BACKGROUND OF THE INVENTION

1. Field of the Invention

The present invention relates to intake devices for outboard motors. More particularly, the present invention relates to an intake device that provides a good inertia charge effect in all speed ranges for an internal combustion engine of an outboard motor.

2. Description of the Related Art

Several factors affect the efficiency and effectiveness of delivering an air charge to an internal combustion engine. It has been found that at low-to-medium engine speeds, a relatively long intake pipe is desired to maximize engine performance. However, at high engine speeds, a relatively short intake pipe is best. It is known to provide an engine air intake system wherein the length of the intake pipes can effectively be lengthened based on engine speeds. An example of such a system is described in U.S. Pat. No. 6,736,100.

Certain other factors also arise in the design of engine air intake systems, especially intake systems for outboard motors. For example, in multi-cylinder engines, air intake into one cylinder may interfere with intake into another cylinder. Also, space constraints are particularly limiting for an outboard motor intake system, as the internal combustion engine and associated components must be enclosed within a cowling.

SUMMARY OF THE INVENTION

Accordingly, there is a need in the art for an outboard motor engine air intake system that can effectively increase intake pipe length to optimize engine air intake for low-to-medium and high engine speeds, that can minimize intake interference throughout the range of engine speeds, and that can fit effectively within the constrained space of an outboard motor cowling.

In accordance with one embodiment, the present invention provides an intake device for an outboard motor internal combustion engine having a plurality of cylinders. The intake device comprises a plurality of main intake pipes, each main intake pipe having an upstream end and a downstream end. The downstream end communicates with a corresponding one of the cylinders. The upstream end is connected to first and second branch pipes. Each first branch pipe has a length greater than a length of each of the second branch pipes. Each second branch pipe has a valve for selectively opening or closing the corresponding second branch pipe. A first surge tank is provided, and upstream ends of the first branch pipes opening into the first surge tank. A second surge tank is formed separately from the first surge tank, and upstream ends of a plurality of the second branch pipes open into the second surge tank. Each of the first and second surge tanks comprise an opening adapted to allow air to flow into the respective surge tank.

In a further embodiment, the engine is a V-type engine having a first bank of cylinders on a right side of a longitudinal planar axis of the engine, and a second bank of cylinders on an opposing left side of the longitudinal planar axis. A right second surge tank is disposed on the right side of the longitudinal planar axis, and a left second surge tank is spaced from the right second surge tank and disposed on the left side of the longitudinal planar axis. In one embodiment, the right and left second surge tanks are connected to one another so that air flows therebetween.

In a still further embodiment, a space is defined between the first and second surge tanks, and at least one auxiliary device is disposed in the space.

In an additional embodiment, an outer surface of the second surge tank has a depression formed therein, and a portion of a first branch pipe fits at least partially in the depression. In one such embodiment, the depression is generally complementary to the first branch pipe.

In a still further embodiment of the invention, an outboard motor is provided comprising an internal combustion engine and an air intake device generally enclosed within a cowling. The air intake device conducts air from within the cowling to a plurality of intake passages of the engine. The intake device comprises a plurality of main intake pipes, each main intake pipe comprising a downstream end communicating with a corresponding engine intake passage and comprising an upstream end. Each upstream end is connected to means for selectively forming a relatively long intake air path or forming a relatively short intake path. Means for minimizing intake interference at low/medium engine speeds and means for minimizing intake interference at high engine speeds are also provided.

DETAILED DESCRIPTION OF PREFERRED EMBODIMENTS

Preferred embodiments discussed herein describe aspects of an improved air intake device for a multi-cylinder internal combustion engine of an outboard motor. By employing aspects of the disclosed embodiments, the engine performance improves in all the speed ranges by obtaining a good inertia charge effect in all the speed ranges from a low/middle speed range to a high speed range of the engine.

Preferably, an intake device for a multi-cylinder internal combustion engine of an outboard motor, wherein the engine has a plurality of cylinders, includes a main intake pipe extending from each one of the cylinders, a first branch pipe extending from an extended, or upstream, end of each one of the main intake pipes, an extended end of each one of the first branch pipes communicating with the atmosphere, a second branch pipe extending from the extended, or upstream, end of said each one of the main intake pipes, and a switching valve for opening or closing an upstream end of each one of the second branch pipes.

Each one of the first branch pipes is longer than each one of the second branch pipes. The intake device also includes a first surge tank communicating with the atmosphere. The extended end of each one of the first branch pipes is coupled with the first surge tank. Preferably, the intake device includes a second surge tank formed separately from the first surge tank. The extended end of each one of the second branch pipes is coupled with the second surge tank.

Figure 1:
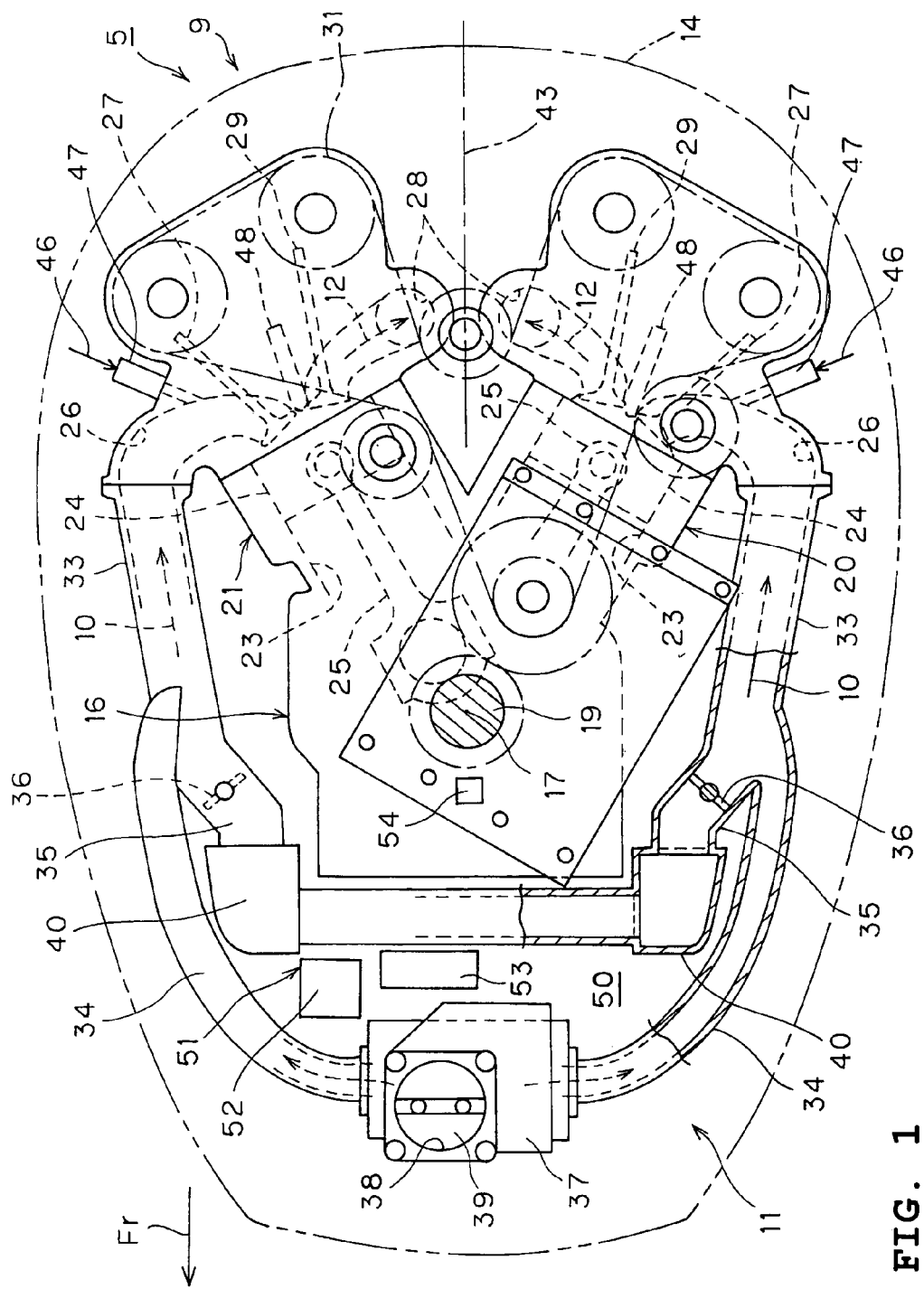
FIG. 1 is a top, partially-sectioned plan view of an outboard motor according to one embodiment.
Figure 2:
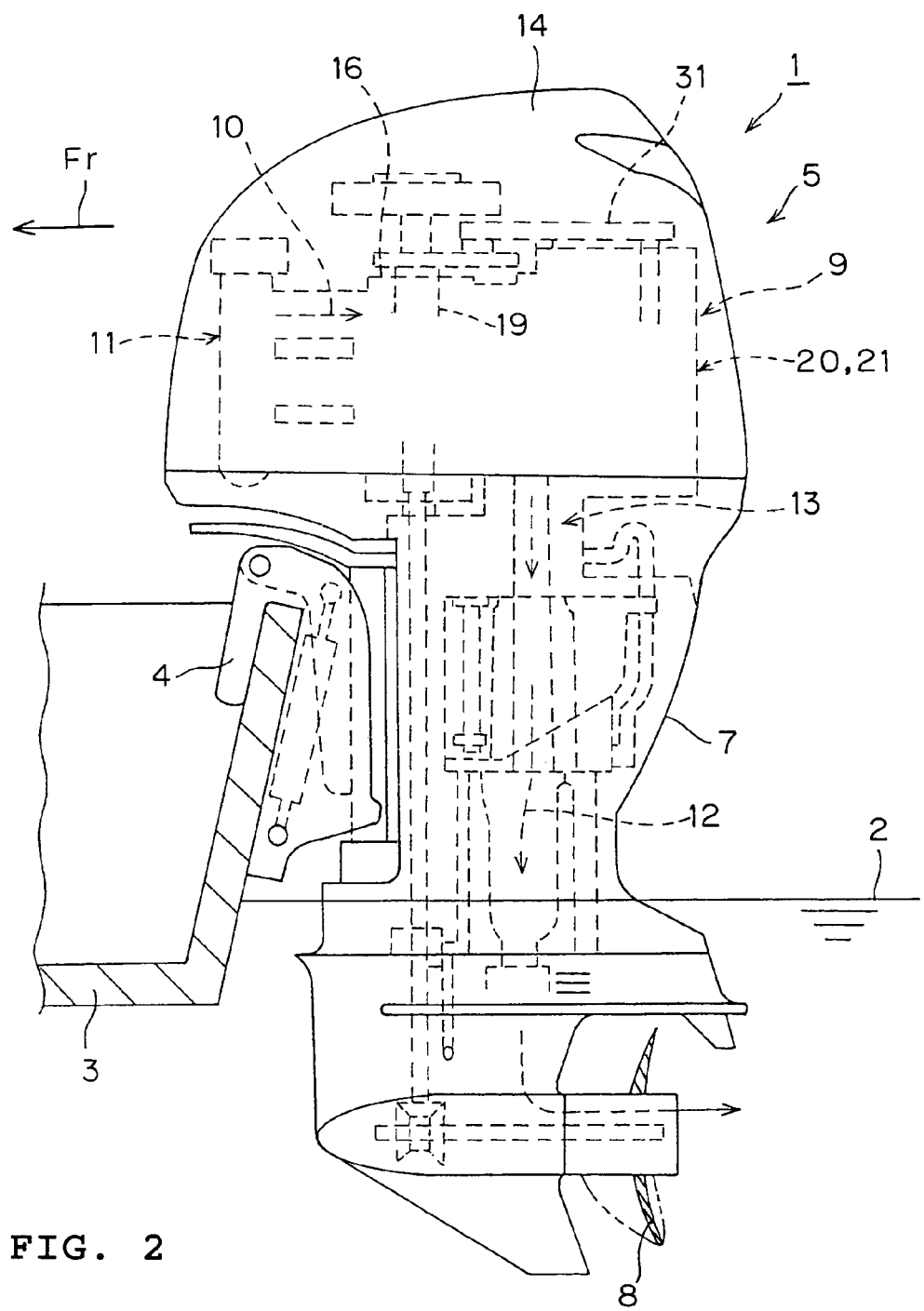
FIG. 2 is a side elevational view of the outboard motor of FIG. 1.

With reference to FIGS. 1–4, an outboard motor 5 is described having aspects of the present invention. With particular reference to FIG. 2, reference numeral 1 indicates a small watercraft. The watercraft 1 includes a hull 3 floating on a body of water 2, and an outboard motor 5 mounted on a transom board of the hull 3 by a clamping bracket 4. The arrow Fr of FIG. 2 indicates a direction of forward movement of the watercraft 1.

The outboard motor 5 has a casing 7 extending vertically and supported by the hull 3 through the clamping bracket 4, a propeller 8 rotatably supported by a lower end portion of the casing 7, and an internal combustion engine 9 supported by an upper end portion of the casing 7 and connected to the propeller 8 for powering it. The outboard motor 5 also has an intake device 11 extending from the engine 9 for introducing air 10 from outside into the engine 9, an exhaust device 13 for discharging exhaust gases 12 coming from the engine 9 to the body of water 2, and a cowling 14 for entirely enclosing the engine 9 and the intake device 11.

With reference to FIGS. 1–4, the illustrated engine 9 is a four cycle, V-type, multi-cylinder engine. The engine 9 includes a crankcase 16 mounted on an upper surface of the casing 7, a crankshaft 19 rotatably supported by the crankcase 16 with an axis 17 thereof extending vertically, and a right side and left side pair of cylinder groups 20, 21 extending generally forward from the crankcase 16 to configure a V-shape in a plan view. Each right or left side of cylinders 20, 21 includes a plurality (three in this embodiment) of cylinders 20, 21 lying one above another.

When the propeller 8 is mechanically coupled with the crankshaft 19 of the engine 9 while the engine 9 operates, the propeller 8 generates thrust force for moving the watercraft 1.

A piston 24 is reciprocally disposed in a cylinder bore 23 of each cylinder 20, 21. Each piston 24 is coupled with the crankshaft 19 through a connecting rod 25 for moving together with the crankshaft 19. Each cylinder 20, 21 has an intake passage 26 communicating with a combustion chamber in the cylinder bore 23 thereof from an outside location of the cylinder 20, 21. An intake valve 27 is provided for each intake passage 26 to open or close the intake passage 26. Also, each cylinder 20, 21 has an exhaust passage 28 connecting the combustion chamber in the cylinder bore 23 to another outside location. An exhaust valve 29 is provided for each exhaust passage 28 to open or close the exhaust passage 28.

The engine 9 has a valve drive mechanism 31 for driving the intake and exhaust valves 27, 29 to open or close the intake and exhaust passages 26, 28, respectively, with the rotation of the crankshaft 19.

In the illustrated embodiment, fuel injectors 47 are provided for injecting fuel 46 so that the fuel 46 is supplied to the combustion chambers in the cylinder bores 23 through the respective intake passages 26. Ignition plugs 48 are provided in such a manner that their discharging electrodes are exposed to the respective combustion chambers.

Figure 3:
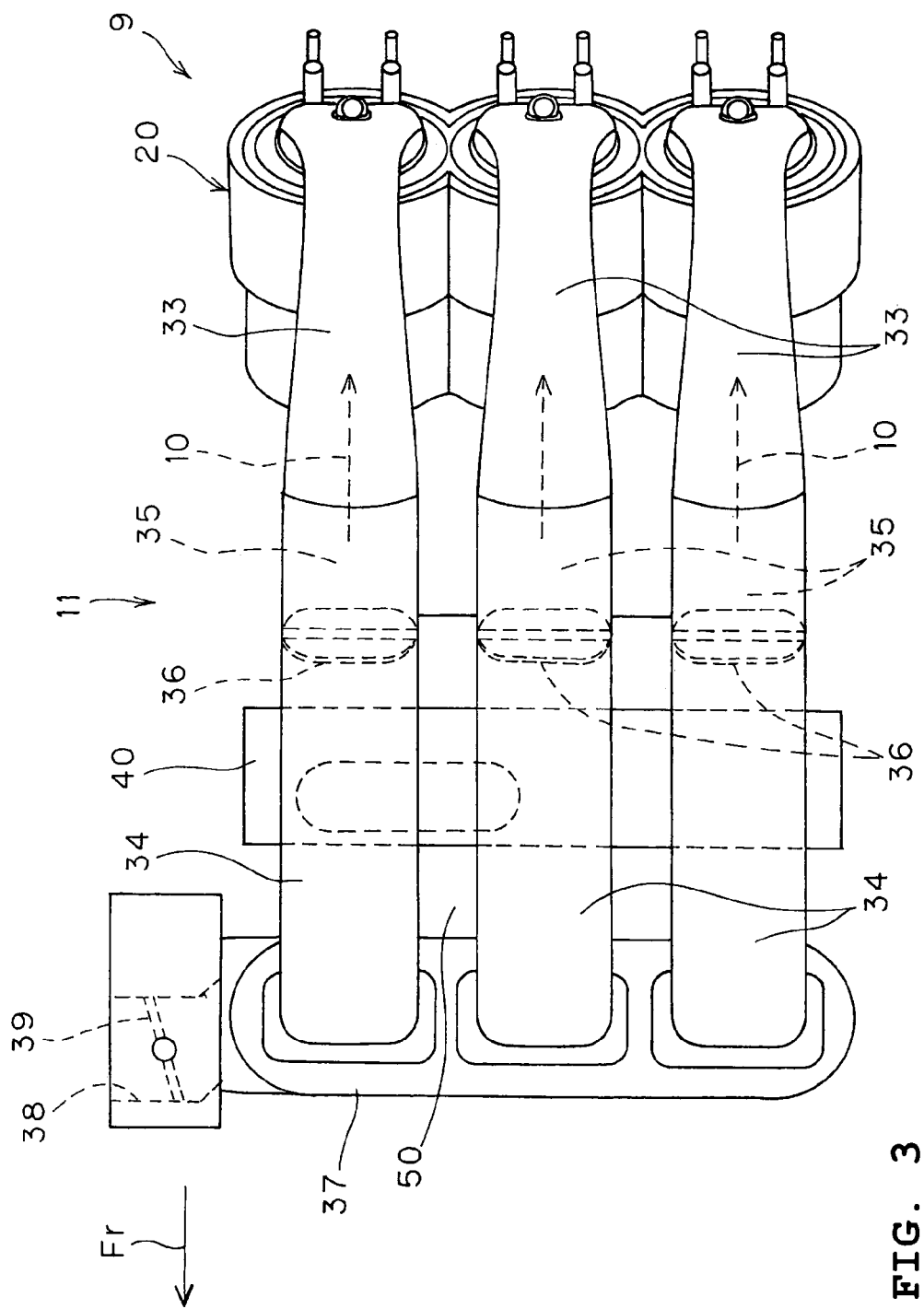
FIG. 3 is a partial side elevational view of an air intake system of the outboard motor of FIG. 1.
Figure 4:
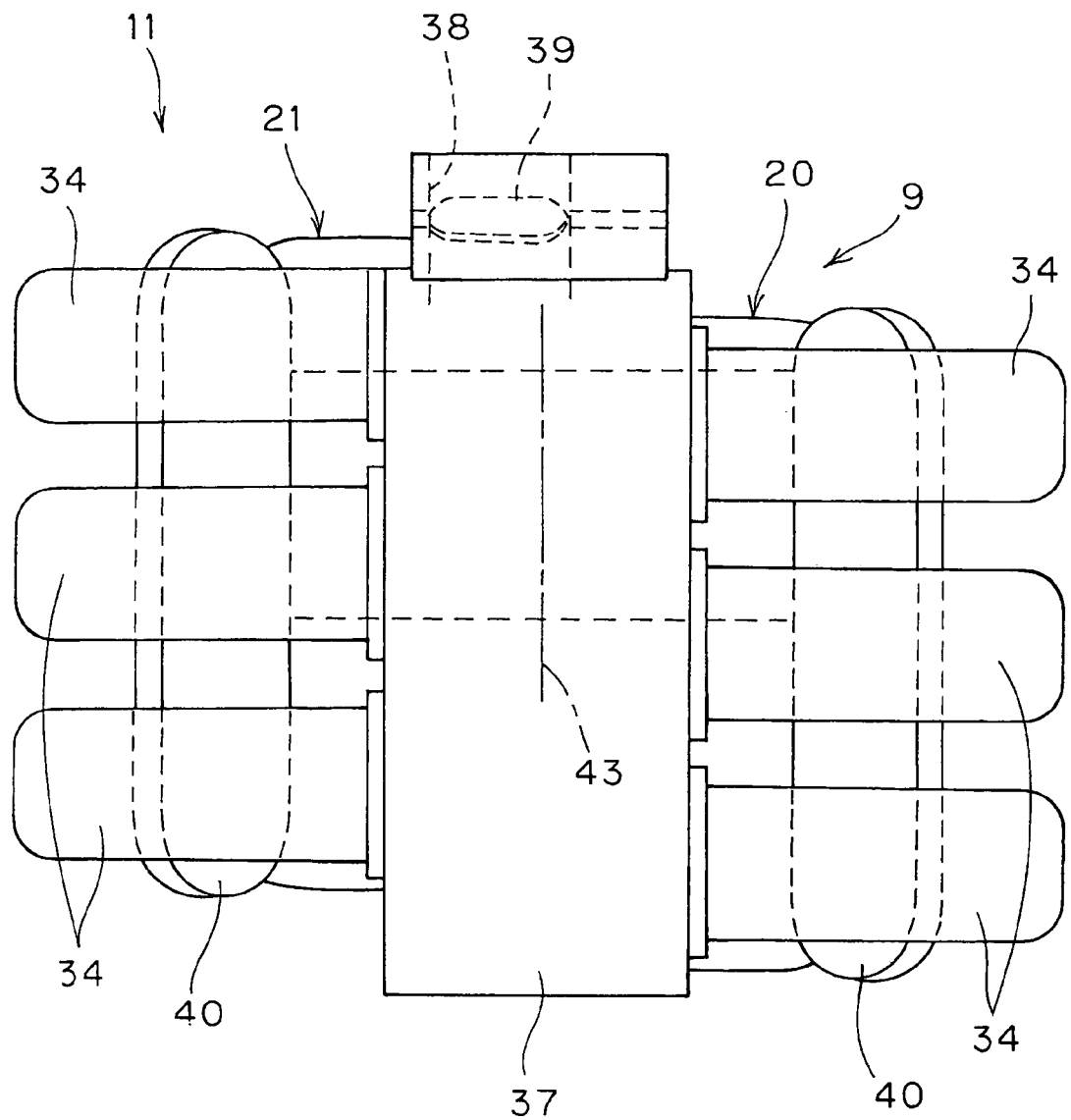
FIG. 4 is a partial front elevational view of the engine air intake system of FIG. 3.

With continued reference to FIGS. 1, 3, and 4, in connection with each right or left group of cylinders 20, 21, the intake device 11 includes a set of main intake pipes 33, a set of first branch pipes 34, a set of second branch pipes 35, and a set of switching valves 36. Each main intake pipe 33 preferably extends forward from the respective cylinder 20, 21. Each first branch pipe 34 preferably extends forward from an extended, or upstream, end of the respective main intake pipe 33. Each second branch pipe 35 also extends forward from an extended, or upstream, end of the respective main intake pipe 33. Each switching valve 36 preferably opens or closes an upstream end of the respective second branch pipe 35. In other embodiments, the switching valve 36 can be disposed at any location along the second branch pipe 35, including the connection between the main pipe 33 and second branch pipe 35. In the illustrated embodiment, the main intake pipes 33, the first branch pipes 34 and the second branch pipes 35 extend generally horizontally. However, other arrangements, such as a slight incline from upstream to downstream ends, can be employed.

The intake device 11 includes a first surge tank 37, a throttle valve 39 and a pair of second surge tanks 40, one surge tank 40 on each of the right and left sides of a longitudinal planar axis 43 of the engine. The respective extended ends of the first branch pipes 34 are coupled with the first surge tank 37 so that air from within the first surge tank 37 flows into the first branch pipes 34. The first surge tank 37 has an opening 38 through which the internal cavity of the first surge tank 37 communicates with the atmosphere. Preferably, the throttle valve 39 opens or closes the opening 38. The respective extended ends of the second branch pipes 35 are coupled with the second surge tank 40 so that air from within the second surge tank 40 flows into the second branch pipes 35.

A downstream end of each right or left main intake pipe 33 communicates with the respective intake passage 26 of the cylinder of the right or left group of cylinders 20, 21. The respective right or left main intake pipes 33 extend along a right or left side surface of the engine 9. The respective first branch pipes 34 preferably are positioned away from the engine relative to the second branch pipes 3 and the second surge tank 40. Each first branch pipe 34 is longer than the respective second branch pipe 35. The right and left groups of cylinders 20, 21 share the first surge tank 37 and the throttle valve 39 with each other. The second surge tanks 40 preferably are formed separately from the first surge tank 37.

With continued reference to FIGS. 1–4, the first surge tank 37 preferably is positioned on a hypothetical plane 43 extending along the axis 17 of the crankshaft 19 and between the right and left groups of cylinders 20, 21. The second surge tanks 40 preferably are spaced apart from each other so as to be positioned on both sides of the hypothetical plane 43. At least a portion of each second surge tank 40 faces the right or left side surface of the crankcase 16 of the engine 9. The rest of the portion of each second surge tank 40 is generally positioned in front of the crankcase 16.

In the illustrated embodiment, the respective second surge tanks 40 are unitarily formed with each other, and the respective internal cavities of the second surge tanks 40 communicate with each other. In another embodiment, the second surge tanks 40 are formed separately from one another, and may or may not communicate with each other via an air passage.

The first surge tank 37 and the respective second surge tanks 40 preferably are placed in front of the engine 9. Most preferably, the first surge tank 37 is positioned opposite the engine 9 relative to the second surge tanks 40 so as to be further from the engine 9 than the second surge tanks 40. Preferably, the first surge tank 37 is spaced from the second tanks 40.

Preferably, auxiliary equipment 51 is placed in the space between the first and second surge tanks 37, 40. The auxiliary equipment 51 may include electrical components such as, for example, a control device 52 and a relay box 53. Additional auxiliary equipment 51 may include, for example, a fuel filter unit. It is to be understood that other componentry can also be arranged in the space.

The control device 52 and the relay box 53 preferably are electrically connected to the engine 9, an actuator for closing or opening the switching valves 36, an actuator for closing or opening the throttle valve 39, the fuel injectors 47, the ignition plugs 48, and an engine speed sensor 54 for detecting an engine speed of the engine 9 to electrically control them. In the illustrated embodiment, the control device 52 controls the operation of the engine 9 so that the respective cylinders 20, 21 are in different phases with each other.

When the engine 9 operates in a low/middle speed range, the engine speed sensor 54 detects an engine speed in this range. In one embodiment, the control device 52 closes the switching valve 36 based upon a detection signal from the engine speed sensor 54. Atmospheric air 10 thus is introduced into the respective cylinders 20, 21 through the throttle valve 39, the first surge tank 37, the first branch pipes 34, the main intake pipes 33 and the intake passages 26. The air 10 introduced in such a way and the fuel injected by the fuel injectors 47 are used in combustion, and the operation of the engine 9 continues. In the illustrated embodiment, the extended, or upstream, end of each first branch pipe 34 communicating with the first surge tank 37 is an open end. Thus, a substantial intake pipe length is equal to the sum of the main intake pipe 33 and the first branch pipe 34, which is relatively long. Therefore, a good inertia charge effect can be obtained in the low/middle speed range.

When the engine 9 operates in a high speed range, the engine speed sensor 54 detects an engine speed in this range. In one embodiment, the control device 52 opens the switching valve 36 based upon a detection signal from the engine speed sensor 54. Atmospheric air 10 thus is introduced into the respective cylinders 20, 21 through the same routes as those which described above, and is used in combustion. On this occasion, the extended, or upstream, end of each second branch pipe 35 communicating with one of the second surge tanks 40 is an open end. Thus, a substantial intake pipe length is equal to the sum of the main intake pipe 33 and the second branch pipe 35, which is relatively short. Therefore, a good inertia charge effect can be obtained in the high speed range.

As thus described, each first branch pipe 34 preferably is longer than the respective second branch pipe 35. The first surge tank 37 communicates with the atmosphere, and the respective upstream ends of the first branch pipes 34 are coupled with the first surge tank 37 so as to open into the first surge tank 37. The second surge tanks 40, which are formed separately from the first surge tank 37, communicate with the atmosphere, and the respective upstream ends of the second branch pipes 35 are coupled with the second surge tanks 40 so as to open into the second surge tanks. Preferably, the engine 9 is enclosed within a cowling, and the surge tanks 47, 40 draw in air from within the cowling.

In the illustrated arrangement, the first surge tank 37 inhibits intake interference among the respective cylinders 20, 21 from occurring in the low/middle speed range of the engine 9 when the switching valve 36 is closed in this range. On the other hand, the second surge tanks 37 inhibit the intake interference among the respective cylinders 20, 21 from occurring in the high speed range of the engine 9 when the switching valve 36 is opened.

In an embodiment described above, the first surge tank 37 and the second surge tanks 40 are separately formed from each other. Thus, different configurations and capacities can be decided between the first surge tank 37 and the second surge tanks 40 so that a good inertia charge effect can be obtained in both the low/middle speed range and the high speed range because each surge tank is optimized for its role. The good inertia charge effect and minimizing of intake interference thus can be obtained in all the speed ranges from the low/middle speed range to the high speed range. As a result, the engine performance can improve in all the speed ranges.

Also, as described above, the illustrated engine 9 is a multi-cylinder, V-type engine in which the cylinders 20, 21 are divided into the right side group of cylinders 21 and the left side group of cylinders 20. The intake device includes the pair of the second surge tanks 40 which are spaced apart from each other to be positioned on both sides of the hypothetical plane 43 extending along the axis 17 of the crankshaft 19 and between the right side group of cylinders 21 and the left side group of cylinders 20, and the second surge tanks 40 are connected to each other. As such, spaces on both lateral sides of the engine 9 are available for the second surge tanks 40. Those spaces can contribute to improving the degree of freedom for design of the configuration and the capacity of the respective second surge tanks 40.

In addition, if the second surge tanks 40 are arranged using the spaces on both the lateral sides of the engine 9 as described above, the surge tanks 40 can be disposed very close to the cylinders 20, 21. The second branch pipes 35 positioned between the cylinders 20, 21 and the second surge tanks 40 thus can be very short. That is, when the switching valve 36 is opened, the substantial pipe length can be short. Thus, the good inertia charge effect can be obtained in a higher speed range. Accordingly, in another embodiment, the second surge tanks are disposed even closer to the intake passages 26 than in the illustrated embodiments.

In an embodiment in which the second surge tanks 40 are connected to each other so that air can flow between the tanks, the aggregate volume of the second surge tanks 40 can effectively be increased, even though each surge tank has a relatively small volume. The combined second surge tanks 40 thus can more effectively inhibit the intake interference among the cylinders 20, 21 from occurring. Consequently, a better inertia charge effect can be obtained.

In the illustrated embodiment, the first surge tank 37 is positioned opposite the engine 9 relative to the second surge tanks 40, and the internal cavity of the first surge tank 37 communicates with the atmosphere through the throttle valve 39. The second surge tanks 40 are positioned between the throttle valve 39 and the engine 9, and thus the throttle valve 39 is spaced apart from the engine 9. The air 10 introduced into the engine 9 through the throttle valve 39 thus is only minimally heated, if at all, by the engine 9. Thus, engine performance can improve in connection with the charging efficiency, accordingly.

Also, in embodiments in which the throttle valve 39 has an actuator for driving the valve 39, this actuator is only minimally heated by the engine 9. This is advantageous for extending the life span of the throttle valve 39 and actuator.

In the embodiments illustrated in FIGS. 1–4, auxiliary equipment 51 is placed in a space 50 between the first and second surge tanks 37, 40. As such, the second surge tanks 40 are positioned between the engine 9 and the auxiliary equipment 51. The second surge tanks 40 thus prevent the auxiliary equipment 51 from being heated by the engine 9, or at least reduce such heating. This is advantageous for extending the life span of the auxiliary equipment 51.

Preferably, the auxiliary equipment 51 is positioned between the throttle valve 39 and the engine 9 in addition to the second surge tanks 40. Thus, the throttle valve 39 is separated apart even farther from the engine 9 than if only the second surge tanks 40 were disposed between the valve and the engine 9. The air introduced into the engine 9 through the throttle valve 39 thus is even less likely to be substantially heated by the engine 9. As a result, engine performance further improved.

Figure 5:
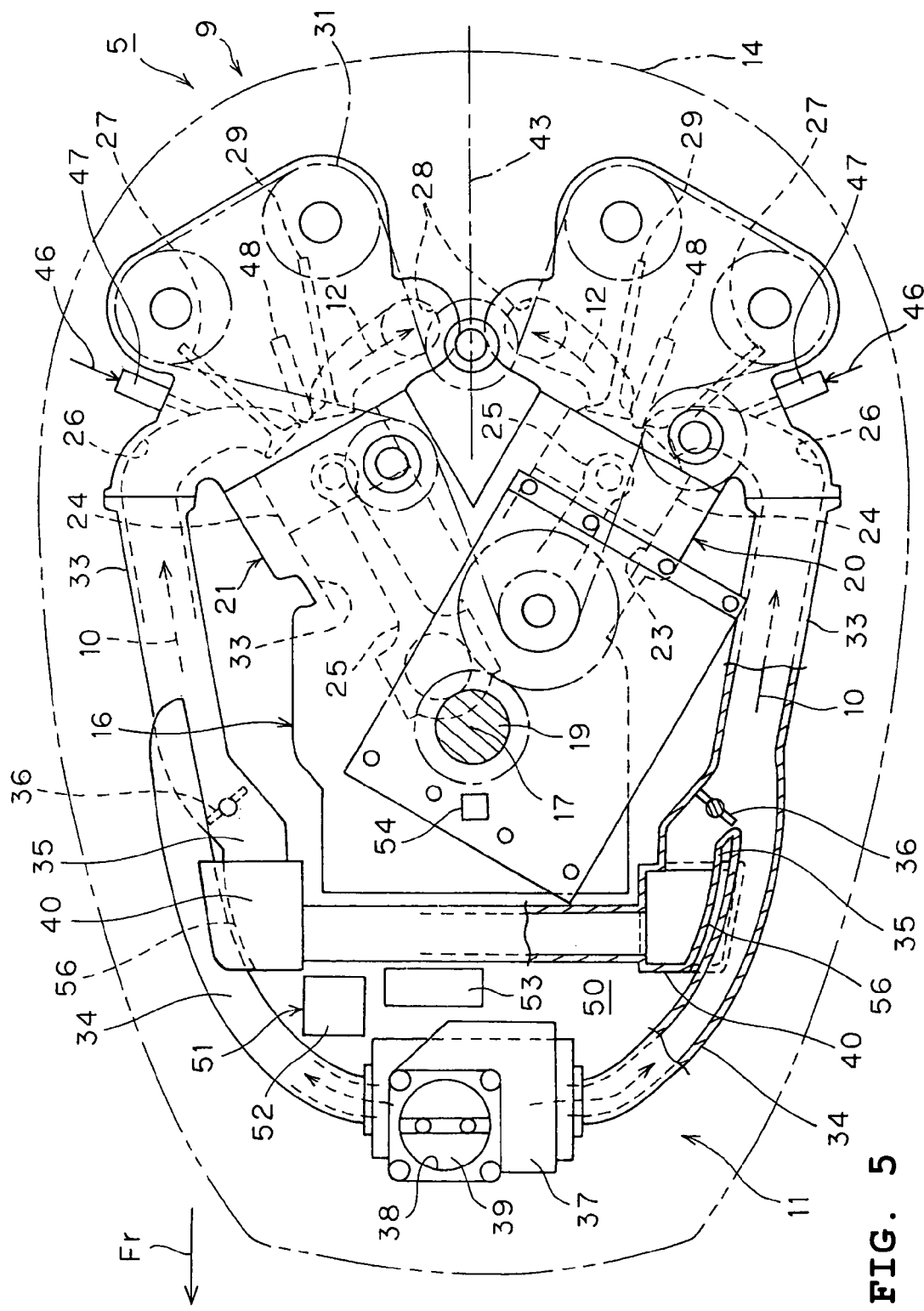
FIG. 5 is a top, partially-sectioned plan view of another embodiment of an outboard motor.
Figure 6:
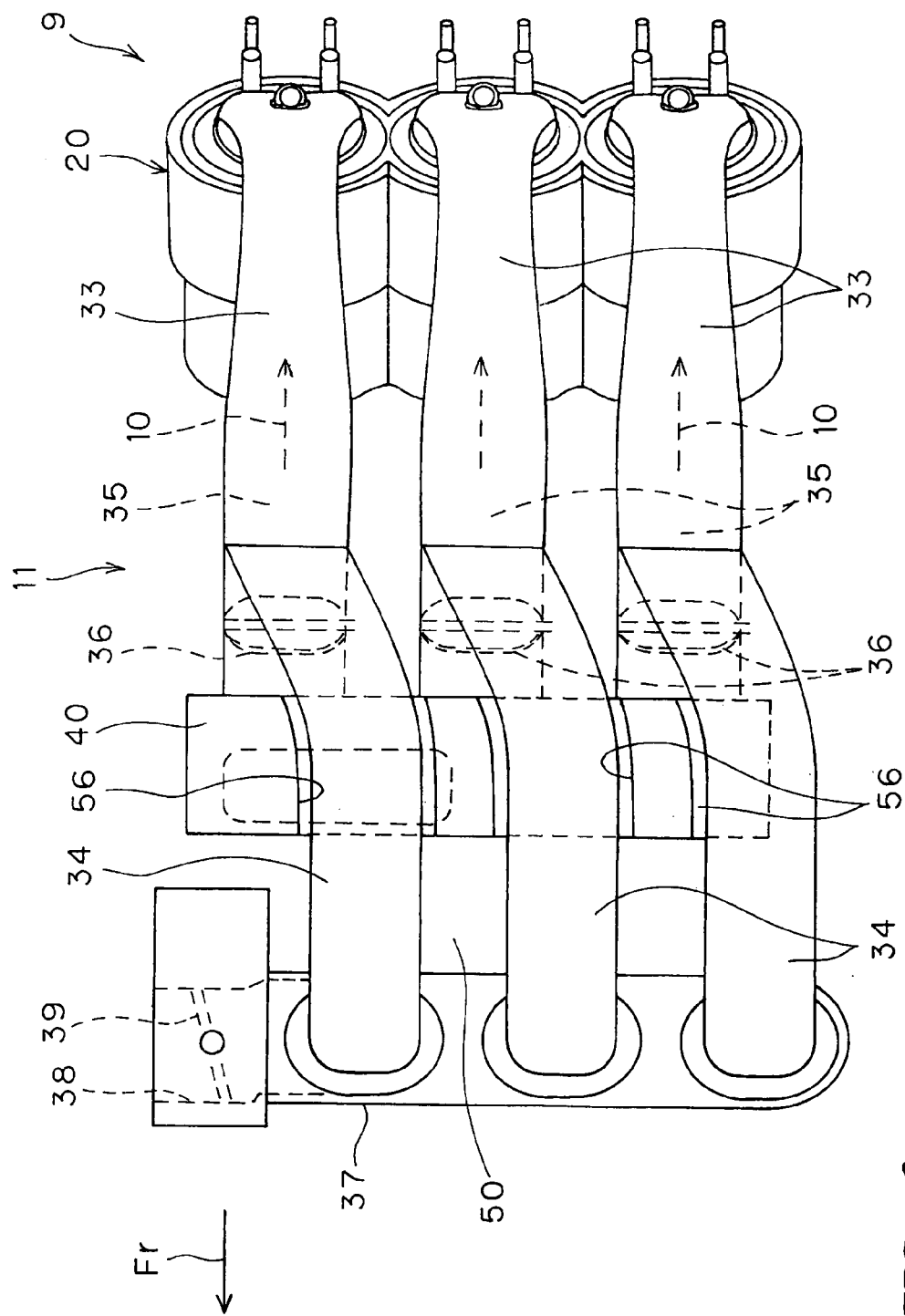
FIG. 6 is a partial side elevational view of an air intake system of the outboard motor of FIG. 5.

With reference next to FIGS. 5 and 6, another embodiment is illustrated which has a similar construction to the embodiments described above, and can act similarly to such embodiments to provide effects similar to those of the previous embodiments. Thus, regarding similar devices, units, components and members, and also similar actions and effects, the same reference numerals or symbols are assigned to those which have already been described, and will not be described repeatedly. In other words, different points will be mainly described below. Also, portions of the constructions of the respective embodiments can be combined in various ways as desired by one of skill in the art.

In the embodiment illustrated in FIGS. 4 and 5, an outer side area of each second surge tank 40 is generally contoured so as to have a plurality of depressions 56 that are generally complementary to portions of respective first branch pipes 34. Preferably, the depressions 56 are generally elongate in a longitudinal direction of the hull 3 and are correspondingly complementary to the mid portions of respective first branch pipes 34 in the longitudinal direction of such pipes. Midportions of the respective first branch pipes 34 and the outer side of each second surge tank 40 at least partially overlap one another in a plan view of the motor as illustrated in FIG. 5.

The illustrated construction enables the capacity of the second surge tanks 40 to be increased without causing the first branch pipes 34 to protrude further outward on the lateral sides of the outboard motor 5. As such, the engine performance can be improved. In addition, it is advantageous for reduction in aerodynamic resistance and operability because the size of the outboard motor 5 in its transverse direction can be smaller.

With particular reference to FIG. 6, in the illustrated embodiment, almost the entire part of each first branch pipe 34 in its longitudinal direction is positioned lower than both of the associated main intake pipe 33 and the second branch pipe 35. Thus, even if water is sucked into the first branch pipes 34 through the throttle valve 39 and the first surge tank 37, much or all of the water will not proceed to the cylinder 20, 21 or the inner cavity of each second surge tank 40 because the main intake pipes 33 and the second branch pipes 35 associated with the respective first branch pipes 34 are positioned higher than the first branch pipes 34, and water thus will not flow into the main 33 and second branch pipes 35. This is advantageous for keeping the engine performance under a good condition.

The illustrated embodiments have employed aspects of the invention in connection with a V-type multi-cylinder engine. It is to be understood, however, that aspects of the present invention can also be employed with an in-line type of engine, a single-cylinder engine, or other types of internal combustion engines, such as, for example, rotary engines that includes one or more rotors.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An intake device for an outboard motor internal combustion engine having a plurality of cylinders, the intake device comprising a plurality of main intake pipes, each main intake pipe having an upstream end and a downstream end, the downstream end communicating with a corresponding one of the cylinders, the upstream end connected to first and second branch pipes, each first branch pipe having a length greater than a length of each of the second branch pipes, each second branch pipe having a valve for selectively opening or closing the corresponding second branch pipe, a first surge tank, upstream ends of the first branch pipes opening into the first surge tank, a second surge tank formed separately from the first surge tank, upstream ends of a plurality of the second branch pipes opening into the second surge tank, each of the first and second surge tanks comprising an opening adapted to allow air to flow into the respective surge tank.

2. An outboard motor comprising the intake device of claim 1, wherein the engine is a V-type engine having a first bank of cylinders on a right side of a longitudinal planar axis of the engine, and a second bank of cylinders on an opposing left side of the longitudinal planar axis, a right second surge tank disposed on the right side of the longitudinal planar axis, a left second surge tank spaced from the right second surge tank and disposed on the. left side of the longitudinal planar axis, wherein the right and left second surge tanks are connected to one another so that air flows therebetween.

3. An outboard motor as in claim 2, wherein at least a portion of each second surge tank is disposed between the engine and the first surge tank.

4. An outboard motor as in claim 3, wherein a space is defined between the first and second surge tanks, and at least one auxiliary device is disposed in the space.

5. An outboard motor as in claim 2, wherein an aggregate volume of the second surge tanks is different than a volume of the first surge tank.

6. An intake device as in claim 1, wherein the first surge tank is disposed farther from the engine than the second surge tank, and the first surge tank comprises a throttle valve adapted to regulate air flow into the first surge tank.

7. An intake device as in claim 6, wherein a space is defined between the first and second surge tanks, and at least one auxiliary device is disposed in the space.

8. An intake device as in claim 1, wherein an outer surface of the second surge tank has a depression formed therein, and a portion of a first branch pipe fits at least partially in the depression.

9. An intake device as in claim 8, wherein the first branch pipes and the second surge tank at least partially overlap one another.

10. An intake device as in claim 8, wherein the depression is generally complementary to the first branch pipe.

11. An intake device as in claim 1, wherein each first branch pipe is positioned generally lower than the associated main intake pipe.

12. An intake device as in claim 1, wherein the first surge tank has a first volume, the second surge tank has a second volume, and the first and second volumes are different from one another.

13. An outboard motor comprising an internal combustion engine and an air intake device generally enclosed within a cowling, the air intake device conducting air from within the cowling to a plurality of intake passages of the engine, the intake device comprising a plurality of main intake pipes, each main intake pipe comprising a downstream end communicating with a corresponding engine intake passage and comprising an upstream end, each upstream end connected to means for selectively forming a relatively long intake air path or forming a relatively short intake path, air for the long intake path being drawn from a first tank and air for the short intake path being drawn from a second tank formed separately from the first tank, means for minimizing intake interference at low/medium engine speeds and means for minimizing intake interference at high engine speeds.

14. An outboard motor as in claim 13, wherein the first and second tank each enclose a different volume.

15. An outboard motor as in claim 14, wherein the second tank is disposed closer to the engine than the first tank.

16. An outboard motor as in claim 14, wherein the second tank comprises means for complementarily fitting against the means for selectively forming.

17. An outboard motor as in claim 13 additionally comprising means for inhibiting water from flowing from the means for selectively forming into the main intake pipes.

* * * * *